United States Patent [19]
Watson

[11] Patent Number: 5,270,819
[45] Date of Patent: Dec. 14, 1993

[54] SINGLE LOOP ANALOG-TO-DIGITAL CONVERSION AND VIDEO CLAMPING CIRCUIT COMPATIBLE WITH AUTOMATED DIAGNOSTICS

[75] Inventor: Larry W. Watson, Grass Valley, Calif.

[73] Assignee: The Grass Valley Group, Inc., Neveda City, Calif.

[21] Appl. No.: 736,982

[22] Filed: Jul. 29, 1991

[51] Int. Cl.$^5$ .............................................. H04N 5/18
[52] U.S. Cl. ..................................... 358/172; 358/174; 341/110
[58] Field of Search ............... 358/174, 138, 160, 139, 358/168, 172; 341/110, 118

[56] References Cited

U.S. PATENT DOCUMENTS

| | | | |
|---|---|---|---|
| 4,149,256 | 4/1979 | Sumi et al. | 341/110 X |
| 4,353,060 | 10/1982 | Endoh et al. | 341/110 |
| 4,525,741 | 6/1985 | Chahal et al. | 358/174 X |
| 4,562,471 | 12/1985 | Eouzan et al. | 358/172 |
| 4,625,240 | 11/1986 | Yablonski et al. | 358/174 X |
| 4,790,011 | 12/1988 | Bellavia, Jr. | 358/172 X |
| 4,860,012 | 8/1989 | Rich et al. | 341/110 X |
| 4,910,592 | 3/1990 | Shroy, Jr. et al. | 358/174 X |
| 5,057,920 | 10/1991 | Wilkinson | 358/172 X |
| 5,121,117 | 6/1992 | Rabii | 358/174 X |

*Primary Examiner*—Victor R. Kostak
*Attorney, Agent, or Firm*—Boulden G. Griffith

[57] ABSTRACT

A single loop analog-to-digital conversion and video clamping circuit includes a low-pass filter and analog amplifier that present the incoming analog video signal to an analog-to-digital converter and to the input of a limit detector and protection circuit. The output of the analog-to-digital converter is sampled an integer multiple of four times during the black interval, with the results being summed and averaged. The resulting value is then scaled and limited, and compared to the desired level for a representation of black. Any resulting error quantity is converted from digital back to, analog and modified if necessary by the output of the limit detector and protection circuit. The signal that results from that modification is low-pass filtered and converted to a current by a transconductance amplifier. The resulting feedback current is then applied to a capacitor in the input circuitry, thereby clamping the input and resulting digital output of the overall circuit to the desired level. This circuit is also compatible with automated digital diagnostics, in that changing the desired black level by a small but detectable amount and verifying correct operation can he accomplished even in the presence of a video signal. And, in the absence of a video signal, the reference level can be changed between black and white and the digital output video value can be read back by a microprocessor to verify correct operation.

14 Claims, 5 Drawing Sheets

SINGLE LOOP ANALOG-TO-DIGITAL CONVERSION AND VIDEO CLAMPING CIRCUIT COMPATIBLE WITH AUTOMATED DIAGNOSTICS

BACKGROUND OF THE INVENTION

This invention relates to video signal processing, and more particularly to the combined functions of converting a video signal from analog-to-digital and clamping the video signal to a reference level.

Clamping is performed in conjunction with the analog-to-digital conversion of the video signal in order to precisely establish the digital value associated with the black reference level of the analog video signal input and to eliminate any 60 Hz "hum" that may be present in the environment.

Figure 1:
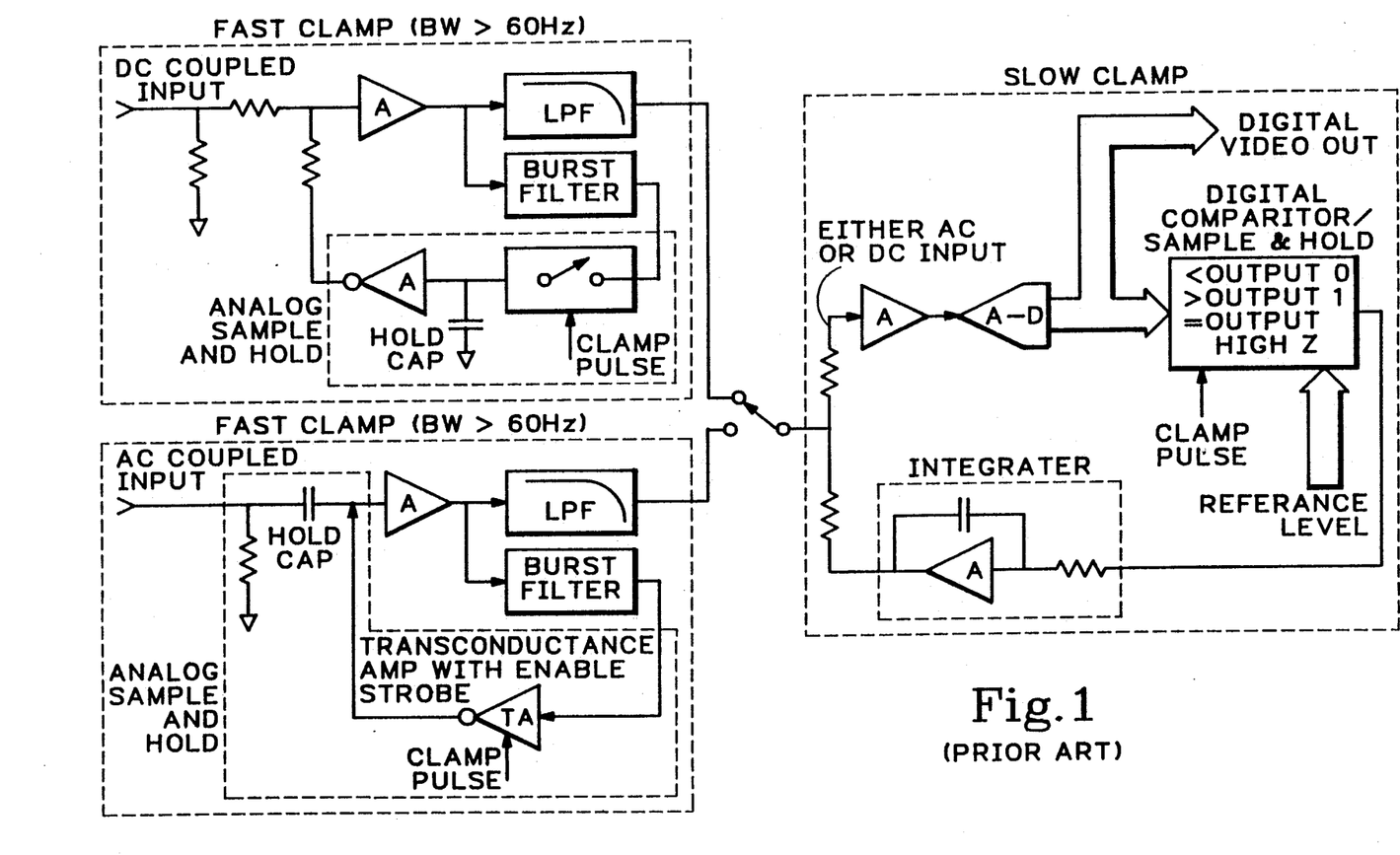
FIG. 1 is a block diagram of a prior art analog-to-digital conversion and video clamping circuit having two clamping stages, one of which is completely analog.

In the prior art circuit shown in FIG. 1, the clamping is performed in two stages. A first fast clamping stage samples the incoming analog video through a burst filter at the time of a clamp signal. The clamp signal occurs during the black interval and subcarrier burst time on the "back porch" of the horizontal sync interval. The burst filter blocks the subcarrier burst so that the black level may be examined free of the influence of the burst.

The sample is taken at the output of the first amplifier in the signal path after either AC or DC coupling. The analog sample and hold circuitry that performs the sampling has an inverting amplifier at its output that returns an inverted version of the sample as feedback to the input of the amplifier. This first analog clamp is relatively fast and typically has a bandwidth and dynamic range great enough to substantially reduce a large 60 Hz component that may be modulating the video due to ground current loops or related phenomena. The output of the first clamp is low-pass filtered to provide anti-aliasing and applied to the input of a second, slower clamping stage that also performs the analog-to-digital conversion.

In this second stage the analog signal is converted to digital and this digital video signal is also sampled at the time of the clamp signal. The result of that sampling is compared to a reference level to produce a feedback signal that is then integrated over a relatively long time constant to produce a low bandwidth clamping action. The feedback signal is a single bit corresponding to an error of one least significant bit (LSB) of black level change, and so only this single bit of correction is provided each sample period. Thus, this stage is limited to correcting very low frequency errors, such as drift due to temperature change.

The first clamping stage shown in FIG. 1 poses certain problems in that both analog burst filters and analog sample and hold circuits are difficult to implement without introducing impedance anomalies and spurious signal components. Analog sample and hold circuits also tend to produce glitches at the times of their turn on and turn off transitions. Moreover, the combination of the first and second stage of clamping requires more circuitry than is desirable if an alternative were available. And, the circuit shown in FIG. 1 is incompatible with automated digital diagnostics.

SUMMARY OF THE INVENTION

Accordingly, it is an object of the present invention to provide analog-to-digital conversion and clamping of a video signal with a minimum number of parts, especially analog components.

It is also an object of the present invention to provide analog-to-digital conversion and clamping of the video signal with a circuit that includes a digital rather than an analog sample and hold circuit, so that the glitches associated with turn on and off transitions are avoided.

It is also an object of the present invention to provide clamping of the video signal with a circuit that does not require an analog burst filter in the sampling path.

It is also an object of the present invention to provide analog-to-digital conversion and clamping of the video signal in a manner that is compatible with automated digital diagnostics.

It is also an object of the present invention to provide analog-to-digital conversion and clamping of the video signal in a manner that maintains linear operation of all amplifiers in the absence of clamp pulses or if the digital portion of the clamp circuit fails.

It is also an object of the present invention to provide a significant error correction over the whole line interval, rather than just during two or three microseconds of back porch time.

In accordance with the invention, there is provided a single loop analog-to-digital conversion and video clamping circuit that includes a low-pass filter and analog amplifier that present the incoming analog video signal to an analog-to-digital converter and to the input of a limit detector and protection circuit. The output of the analog-to-digital converter is sampled an integer multiple of four times during the black and burst interval, with the results being summed and averaged to filter out the burst. The resulting value is then scaled and limited, and compared to the desired level for a representation of black. Any resulting error quantity is converted from digital back to analog and modified if necessary by the output of the limit detector and protection circuit. The signal that results from that modification is low-pass filtered and converted to a current by a transconductance amplifier. The resulting current is then fed back to the input circuitry, thereby clamping the input and resulting digital output of the overall circuit to the desired level.

This single loop analog-to-digital conversion and video clamping circuit is also compatible with automated digital diagnostics, in that changing the desired black level by a small but detectable amount and verifying correct operation can be accomplished even in the presence of a video signal. And, in the absence of a video signal, the reference level can be changed between black and white and the digital output video value can be read back by a microprocessor to verify correct operation or the absence thereof.

The subject matter of the present invention is particularly pointed out and distinctly claimed in the concluding portion of this specification. However, both the organization and method of operation, together with further advantages and objects thereof, may best be understood by reference to the following detailed description and accompanying drawings.

DETAILED DESCRIPTION

It will be assumed for the purpose of following description that the input signal is NTSC and that the desired output is NTSC D2, which is a 10-bit signal in which nominal black is defined as $0F0_{hex}$ ($240_{dec}$) and nominal white is $320_{hex}$ ($800_{dec}$). It should be understood, however, that the invention described below could readily be adapted to work with other video formats by those skilled in the video arts.

Figure 2:
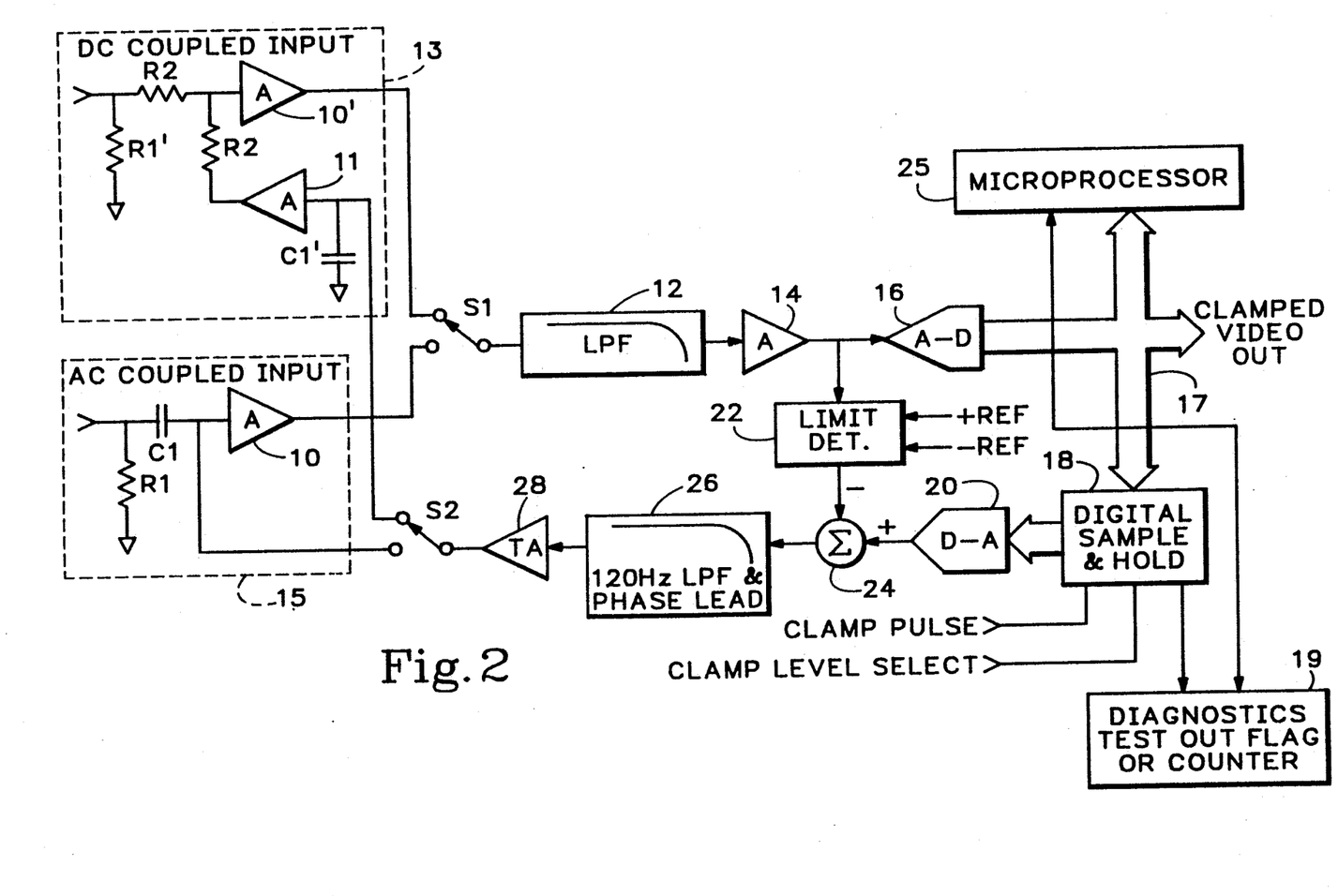
FIG. 2 is a block diagram of a single loop analog-to-digital conversion and video clamping circuit according to the present invention.

FIG. 2 is a block diagram of an analog-to-digital conversion and video clamping circuit according to the present invention. The input video signal can either be DC coupled 13 or AC coupled 15, as indicated by switches S1 and S2. In the AC coupled input arrangement 15, the input signal is developed across resistor R1 and coupled to amplifier 10 across DC blocking resistor C1. When the input is AC coupled the feedback providing the clamping is applied to the the junction of C1 and the input of amplifier 10.

In the DC coupled input arrangement 13, the input signal is developed across resistor R1' and coupled to amplifier 10' through resistor R2. When DC coupling is used, the feedback providing the clamping is applied to the input of amplifier 10' through resistor R3 from amplifier 11 based on the charge on C1'.

Figure 3A:
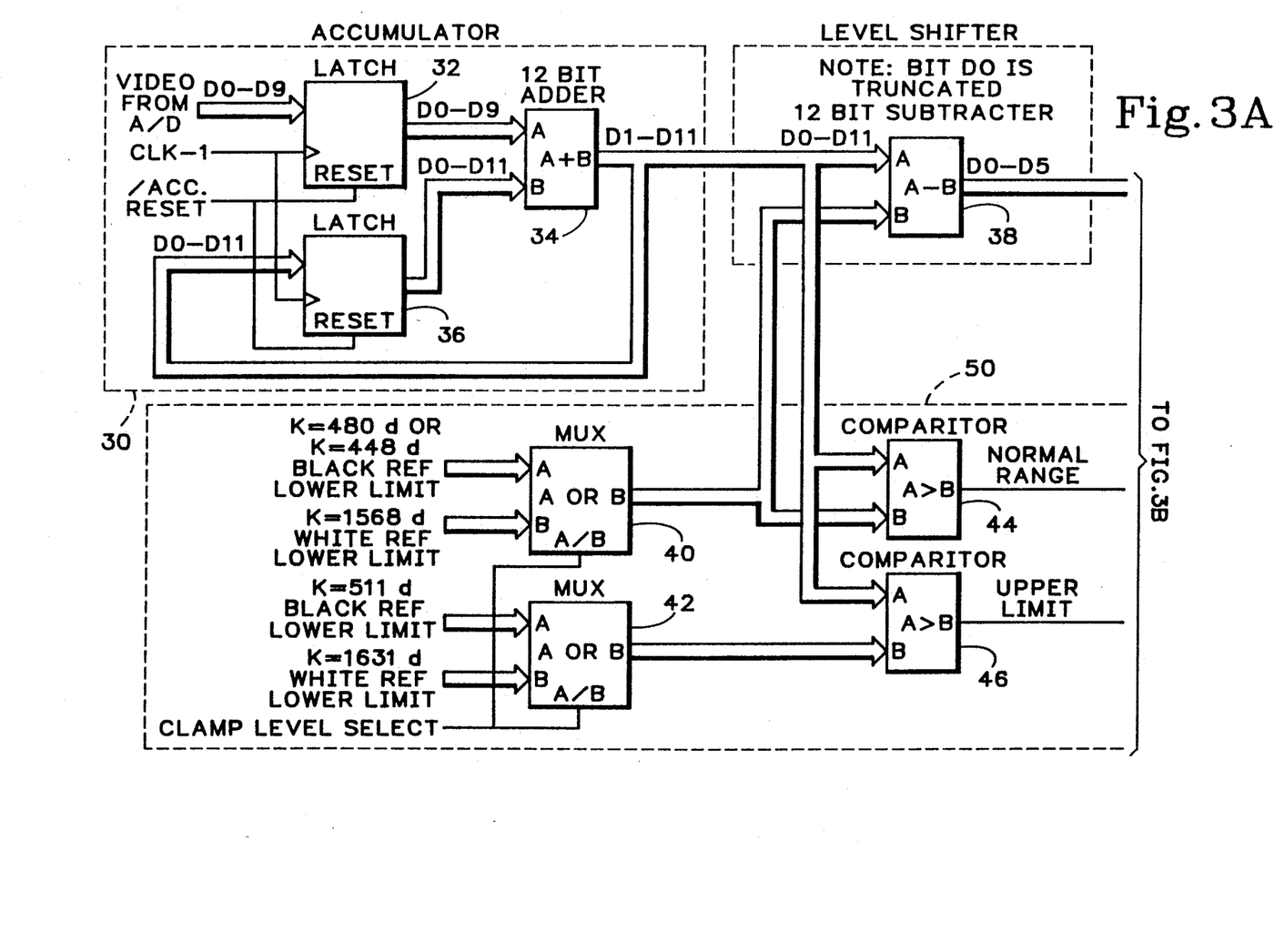
FIGS. 3A and 3B are block diagram of the digital sample and hold circuitry that appears as a single block in FIG. 2.
Figure 3B:
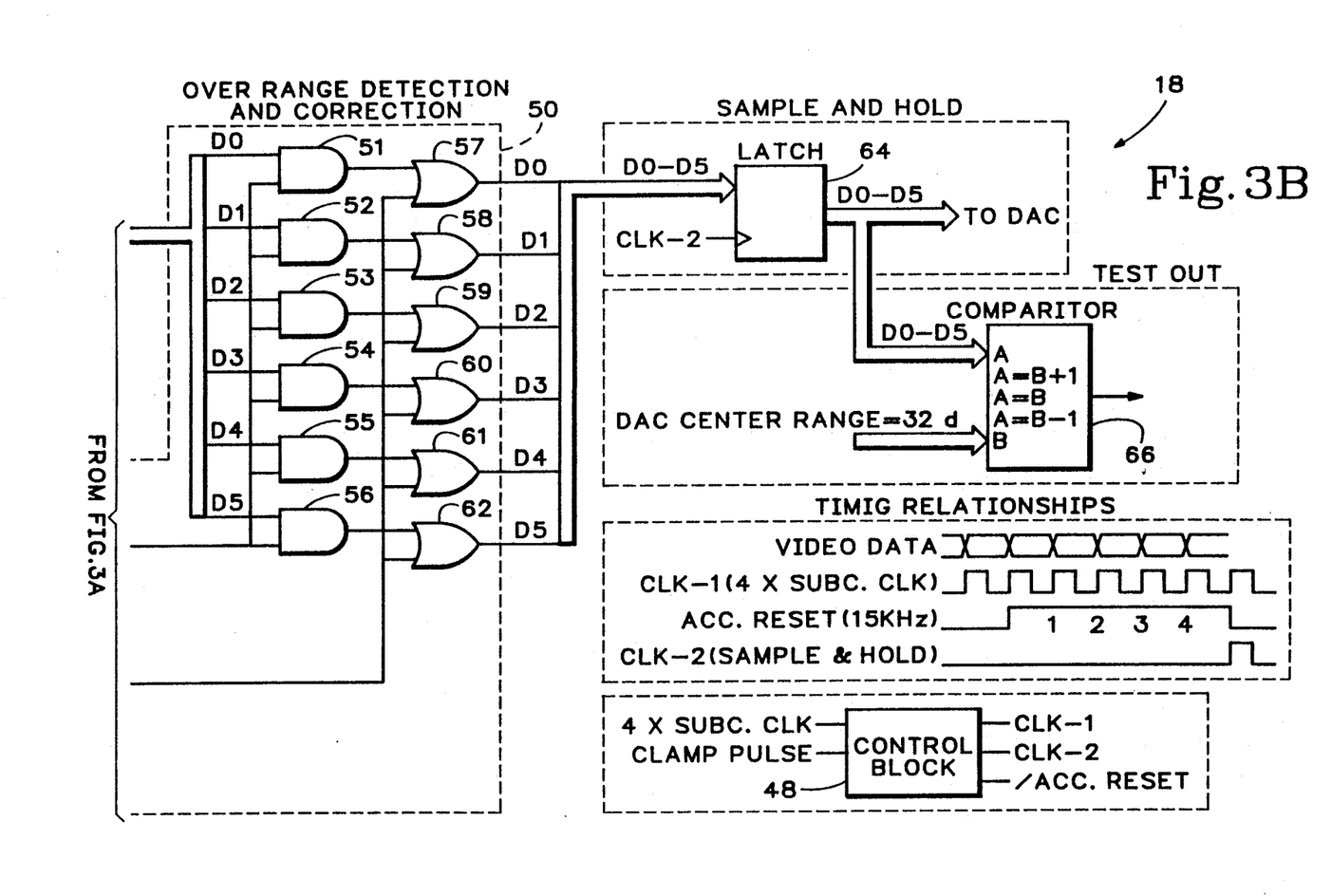

The output of amplifier 10 (or 10') is applied to low pass filter 12, which filters out frequencies above the normal video bandwidth. The output of low pass filter 12 is amplified by amplifier 14 and applied to the input of analog-to-digital converter 16. The output of analog-to-digital converter 16 is the clamped digital video output of the analog-to-digital conversion and video clamping circuit, and it is monitored by digital sample and hold circuit 18. The digital sample and hold circuit 18 will be discussed in detail below in connection with FIG. 3.

The output of the digital sample and hold circuit is an error signal representing the difference between the expected black level and the actual one. This digital error signal is converted to analog by digital-to-analog converter (DAC) 20, producing an analog error signal. The analog error signal is summed with the output of a limit detector 22 in summing circuit 24 to produce a modified error signal. This modified error signal is filtered by low pass filter and phase lead compensation circuit 26 to limit the gain of the loop above 120 Hz and to provide a phase lead that is required for loop stability at some frequencies.

The error voltage is converted into a current by transconductance amplifier 28. In the AC coupled input arrangement 15, the current produced by transconductance amplifier 28 charges C1 to produce an error correction voltage that provides the clamping action. This correction voltage is applied directly to the input of amplifier 10. In the DC coupled input arrangement 13, the clamping feedback signal is stored on C1', buffered by amplifier 11 and applied to the input of amplifier 10' through resistor R3.

Referring now to FIG. 3, the digital sample and hold circuit 18 is here shown in a detailed block diagram. The clamped video output of the analog-to-digital converter 16, which is 10-bits wide, is received by latch 32, which is part of accumulator 30. The output of latch 32 is summed with the contents of latch 36 by the 12-bit adder 34. The output of the 12-bit adder is the input to latch 36, as well as the output of accumulator 30 to the rest of the digital sample and hold circuit 18.

A control block 48 (at the bottom of FIG. 3) receives a clock signal whose clock pulses occur at a rate that is four times the subcarrier frequency and produces a local version of that clock signal, CLK-1. The control block also receives a clamp pulse indicating that the black reference level should be present. In composite video, the subcarrier burst is impressed on the black reference level during the horizontal blanking interval. Upon receiving the clamp pulse, occurs during the portion of the blanking interval the control block 48 generates/ACC RESET for five CLK-1 clock intervals./ACC RESET (accumulator reset not) functions as an accumulator enable signal when it goes high, and keeps the accumulator reset to zero the rest of the time.

While the accumulator is enabled by the high on-/ACC RESET, samples of the video signal are latched by latch 32 on each occurrence of CLK-1. Partial results are stored in latch 36 and added by the 12-bit adder 34 to the most recently acquired sample stored in latch 32. The accumulator 30 collects and sums four samples while/ACC RESET is high. The/ACC reset is high for five clocks, but only four samples are taken, since the-/ACC reset is high for one clock period before the first sample is taken. These four samples are averaged by division and scaling downstream from the accumulator, so that the overall effect is to cancel out opposite phases of the subcarrier burst signal, leaving only the reference black level. This averaging also reduces the effects of any noise that may have been present. Any integer multiple of four samples could also be used, but all of the samples must be taken during the burst, if the burst is present, so that incomplete cancellation is avoided. The clamp pulse is timed to ensure that this condition is satisfied.

Adder 34 is a 12-bit adder to accommodate the 12-bit number that results from summing four 10-bit numbers in accumulator 30. As this 12-bit value is transferred from the accumulator 30 to subtractor 38 for level shifting, it is divided by two by a right shift of one place in the signal connections and a truncation of the least significant bit (LSB). The result is an 11-bit word representing double the sampled black level. This 11-bit word has a resolution that is one half of an LSB of the 10-bit video signal.

The black level for NTSC D2 video is $0F0_{hex}$, or $240_{dec}$. Since the average value of the output signal from the analog-to-digital converter 16 during the sampling period is multiplied by four in the accumulation process and only divided by two once, the black level for NTSC D2 video corresponds to a value of $480_{dec}$ in the 11-bit output of accumulator 30. Similarly, the $800_{dec}$ ($320_{hex}$) white level for NTSC D2 video corresponds to $1600_{dec}$ at the output of accumulator 30. The digital sample and hold 18 produces a 6-bit output, and the center of the range of a 6-bit signal is $20_{hex}$, or $32_{dec}$. Therefore, in order to place the nominal video values in the mid-range of the 6-bit signal, subtractor 38 and multiplexer 40 level shift the output of accumulator 30 by one of the constants on the inputs of multiplexer 40. In one state, multiplexer 40 supplies 448$_{dec}$ to subtractor 38 to shift the black level to the center of the range of the output of the sample and hold circuitry 18, while in its other state, multiplexer 40 supplies 1568$_{dec}$ to subtractor 38 to shift the white level to the center of the same range. As will be further discussed below, a diagnostics routine can switch the reference level from black to white, or from black to near-black, to exercise and monitor the operation of the A/D conversion and video clamping circuitry.

During normal operation, the clamp level select signal selects the black reference lower limit value as the output of multiplexer 40. The value at the output of multiplexer 40 is subtracted from the 11-bit word by subtractor 38 to produce a scaled value indicative of the difference between the black video level being sampled and the nominal black level.

Because the DAC 20 has a limited range, large error signals would create roll-over problems if measures were not taken to detect and correct over range situations. Consequently, over range detection and correction circuitry 50 is employed to detect and correct such conditions. Multiplexers 40 and 42 receive black and white reference lower limits and upper limits, respectively. During normal operation, a high clamp level select signal selects the black reference lower limit at multiplexer 40 and the black reference upper limit at multiplexer 42, whereas during a diagnostics routine, a low clamp level select signal selects the white reference lower limit at multiplexer 40 and the white reference upper limit at multiplexer 42.

Comparator 44 compares the 11-bit output of the accumulator 30 with the output of multiplexer 40 and produces a high normal range signal output when the 11-bit value is larger than the selected lower limit. A high normal range signal enables AND gates 51-56 permitting the scaled value indicative of the video level being sampled to pass through these gates and on to the sample and hold latch 64. When the 11-bit value is less than the lower limit data from multiplexer 40, the normal range signal from comparator 44 goes low and AND gates 51-56 are disabled. Since the output of comparator 46 will also be low under these circumstances, each of the signal lines D0 through D5 at the output of the over range detection and correction circuitry 50 will be low while these conditions pertain.

Comparator 46 compares the 11-bit output of the accumulator 30 with the output of multiplexer 42 and produces a high upper limit signal output when the 11-bit value exceeds the selected upper limit. This high upper limit signal produces a high output from all of the OR gates 57 through 62 during the time that the upper limit is exceeded.

The output signal from the over range detection and correction circuitry 50, lines D0-D5, is transitory in nature, since the /ACC RESET signal goes low at the end of the sample period and at that time the output of the accumulator is reset. Therefore, the value on lines D0-D5 is latched by sample and hold latch 64 at the time of the CLK-2 clock (timing diagram at bottom right of FIG. 3).

The output of the sample and hold latch 64 goes to test out comparator 66 as well as to the DAC 20. Test out comparator 66 compares the value being sent to the DAC 20 with a quantity representing the midrange of the DAC, 32$_{dec}$, which is also the desired output level when the video signal is properly clamped, and outputs a high if its inputs match within plus or minus one LSB.

During proper and stable operation the loop maintains the digital value being sent to the DAC 20 within one LSB of the desired level and the comparator 66 output remains high. If noise or some other extraneous factor is adversely affecting operation, so that the loop is actively steering with error signals of greater than one LSB, the output of digital sample and hold circuitry 18 will be varying by more than one LSB and the comparator 66 output bit will be toggling.

In some systems a microprocessor 25 controller has access to the signal lines 13, carrying this output video level and also has means for sampling that level at a selected time. In such a system, the microprocessor 25 itself can read back and directly examine the video levels present during diagnostic activities or during normal operation. If the microprocessor 25 cannot sample the signal lines 17 carrying the output video, or cannot sample them at the desired times, the output of comparator 66 can be read to determine proper or improper operation.

For a full diagnostic check, when the input to the analog-to-digital conversion and video clamping circuit can be disconnected, the white reference limits can be applied to the digital sample and hold circuitry 18 and, after a brief stabilization time, the resulting value can be read back from the bus 17 by the microprocessor 25 and checked to ensure that it corresponds to the proper white level. The multiplexers 40 and 42 can then be controlled to select the black reference limits again, and the return to the correct black clamping level verified on the bus 17.

To perform diagnostics during normal operation with the video signal present, the black level is varied between the NTSC value of 240$_{dec}$ and the PAL level of 256$_{dec}$ by switching the reference lower limit input to multiplexer 40 between 448$_{dec}$ and 480$_{dec}$. This 16 LSB level shift is small enough to not interfere significantly with the appearance of the video, but large enough to affect the output of the comparator 66, which produces a brief error indication in response to the transitions. The error indication should not persist for very long, so it can be used to set a flag 19, and the flay 19 can then be readout by the microprocessor 25 at the microprocessor's convenience and reset. After waiting a suitable interval, the microprocessor 25 can check the flag 19 again to verify that there has not been another error indication.

Alternatively, a counter 19 can count the number of error indications and the microprocessor 25 can read out the result. In this approach, the microprocessor 25 only needs to check the error count once, after waiting long enough for extra counts to be produced if there is a problem. The count should be greater than zero, indicating that a transition indeed occurred, but smaller than an error limit, indicating that the circuitry stabilized quickly after the transition.

Figure 4:
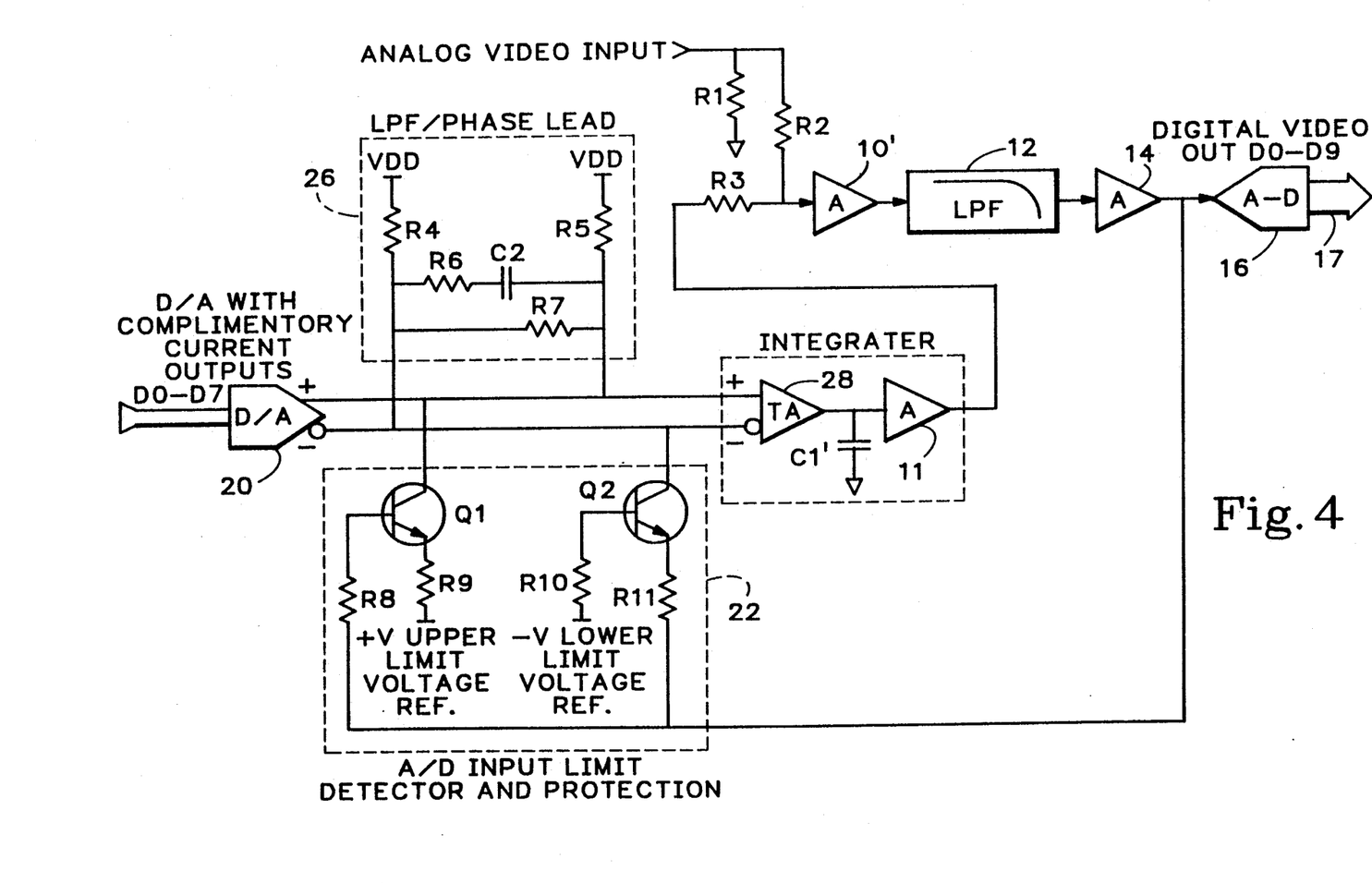
FIG. 4 is a mixed schematic and block diagram of the analog portion of the analog-to-digital conversion and video clamping circuit.

Referring now to FIG. 4, the analog portion of the digital-to-analog conversion and video clamping will be examined in more detail. Referring momentarily to FIG. 2 as well as to FIG. 4, notice that while the limit detector 22, summing circuit 24 and low pass filter and phase lead compensation circuit 26 appear in FIG. 2 as separate and sequential circuits, they are actually more intermixed and sequential than that in the actual implementation shown in FIG. 4.

The DAC 20 shown at the left of FIG. 4 produces complementary current sink outputs that are differentially connected to the inputs of transconductance amplifier 28. These differential current outputs are also connected in parallel to low pass filter and phase lead compensation circuit 26 and to A/D input limit detector and protection circuit 22. The values of C2 and R4, R5, R6 and R7 in the low pass filter and phase lead compensation circuit 116 are chosen to provide minimum attenuation below 120 Hz where ground loops from the power source are a problem. The filter then rolls off in its response at approximately 6 dB/octave from approximately 120 Hz to 2000 Hz, above which there is no additional attenuation as the frequency gets higher. For R4 equal to R5, the transfer function, H(S), of the filter 26 is:

$$H(S) = \frac{S \cdot C2 \cdot R6 \cdot R7 + R7}{S \cdot C2(2 \cdot R4 \cdot R7 + 2 \cdot R4 \cdot R6 + R6 \cdot R7) + 2 \cdot R4 + R7}$$

where S is the output of the digital-to-analog converter 20.

Because the transconductance amplifier 28 and capacitor C1' that it charges form an integrator with a roll-off of 6 dB/octave with increasing frequency, the combined effect of this integrator and filter 26 is to provide a response that rolls off at 6 db/octave from DC to just past 120 Hz, then rolls off at 12 db/octave from 120 Hz to 2 KHz, and then continues rolling off at 6 db/octave thereafter, so that there is a loop gain of <1 at the sampling frequency (determined by the clamping signal which occurs at the horizontal sync rate).

The overall circuit is very effective at suppressing the troublesome 60 Hz components, producing measured results of greater than 35 dB of attenuation at that frequency. Since the theoretical maximum attenuation of a 60 Hz signal using a sampling frequency of 15.7 KHz is about 38.4 dB, greater than 35 dB of measured attenuation is a very satisfactory value.

Referring now to the A/D input limit detector and protection circuit 22, if the output of amplifier 14 begins to exceed the +V upper limit voltage reference supplied to the emitter of transistor Q1 by nearly one $V_{be}$, transistor Q1 begins to turn on. Current flow through the collector of Q1 sinks current from the positive differential input of the transconductance amplifier 28 and thereby reduces the positive voltage applied to that input, thus steering the loop away from the high positive voltage level that had begun to exceed the +V upper limit voltage reference level.

Conversely, if the low-going voltage output of amplifier 14 begins to exceed the −V lower limit voltage reference on the base of transistor Q2 by nearly one $V_{be}$, transistor Q2 begins to turn on. Current flow through the collector of Q2 sinks current from the negative differential input of the transconductance amplifier 28 and thereby reduces the negative voltage applied, thus steering the loop away from the low negative voltage that had begun to exceed the −V lower limit voltage reference level.

The +V upper limit voltage reference and −V lower limit voltage reference are the same as the voltage references used by the resistor ladder of analog-to-digital converter 16, i.e., +2 V and −2 V, respectively. This both saves circuitry and guarantees that proper limits are maintained, even if the references to the ladder of the analog-to-digital converter 16 are changed to alter its gain. Because the actual video upper and lower limits are, respectively, one $V_{be}$ drop greater than the +V upper limit voltage reference and one $V_{be}$ drop less than the lower limit, the full dynamic range of the A/D converter 16 is still available. This approach keeps all of the amplifiers in their linear range if clamp pulses are missing or if the digital portion of the analog-to-digital conversion and video clamping circuitry fails.

The single loop analog-to-digital conversion and video clamping circuit described above has significant advantages over the prior art shown in FIG. 1. Because the analog-to-digital conversion and video clamping circuitry described above is preponderantly digital, it can be integrated into a one PAL (programmable array logic) chip and one accumulator chip or a single custom ASIC (application specific integrated circuit), making the overall circuit size smaller than the prior art circuit. It also has fewer analog subcircuits, and in particular avoids the need for an analog sample and hold circuit or burst filter. The analog-to-digital conversion and video clamping circuit of the present invention is also more compatible with automated diagnostics because of its single loop architecture. In a two loop architecture the loops must be tested independently, and the analog loop is not susceptible to automated testing by digital diagnostics.

The clamping circuit of the present invention also has superior limit detection and protection that maintains linear operation of all amplifiers in the absence of clamp pulses or if the digital portion of the clamp circuit fails.

The clamping circuit of the present invention also provides full error correction of the video signal over the whole line interval, rather than just during two or three microseconds of back porch time. If a large 60 Hz signal is modulating the video in the prior art circuit shown in FIG. 1, the resulting error correction on every sample can be large. By providing the error correction over the whole line interval, the clamping circuit of the present invention provides more stable clamping.

While a preferred embodiment of the present invention has been shown and described, it will be apparent to those skilled in the art that many changes and modifications may be made without departing from the invention in its broader aspects. The claims that follow are therefore intended to cover all such changes and modifications as fall within the true scope of the invention.

What is claimed is:

1. A single loop analog-to-digital conversion and video clamping circuit comprising:
   an analog-to-digital converter coupled to receive an analog video input signal and producing a digital video output signal;
   a digital sample and hold circuit coupled to receive the digital video output signal and a reference signal, and producing a multi-bit digital error signal indicating the amount that the digital video output signal differs from the reference signal during a reference interval, the digital sample and hold circuit including:
   an accumulator coupled to receive the digital video output signal and producing an intermediate digital signal indicative of a level within the digital video signal;
   comparing means coupled to receive the intermediate digital signal and the reference signal, and producing a transitory multi-bit digital error signal; and
   holding means for receiving the transitory multi-bit digital error signal and producing the multi-bit error signal;

a digital-to-analog converter coupled to receive the multi-bit digital error signal and producing an analog error signal that is indicative of the digital error signal; and feedback path means for receiving the analog error signal and applying a clamping feedback signal to the analog video input signal.

2. A single loop analog-to-digital conversion and video clamping circuit according to claim 1, wherein the transitory multi-bit digital error signal has fewer bits than the intermediate digital signal and the digital sample and hold circuit further comprises:

over range detection and correction means for receiving a lower limit signal, an upper limit signal and the transitory multi-bit digital error signal, and producing a stabilized transitory multi-bit digital error signal that has stable maximum or minimum values when an intermediate digital signal value exceeds a range of the transitory multi-bit error signal, the stabilized transitory multi-bit error signal being used as the transitory multi-bit error signal received by the holding means.

3. A single loop analog-to-digital conversion and video clamping circuit according to claim 1 further comprising:

additional comparing means, receiving the multi-bit error signal and a second reference signal and producing a stable operation signal when the multi-bit error signal is within a predetermined range of the second reference signal.

4. A single loop analog-to-digital conversion and video clamping circuit comprising:

an analog-to-digital converter coupled to receive an analog video input signal and producing a digital video output signal;

a digital sample and hold circuit coupled to receive the digital video output signal and a reference signal, and producing a multi-bit digital error signal indicating the amount that the digital video output signal differs from the reference signal during a reference interval, the digital sample and hold circuit including;

a digital-to-analog converter coupled to receive the multi-bit digital error signal and producing an analog error signal that is indicative of the digital error signal; and a feedback path means for receiving the analog error signal and applying a clamping feedback signal to the analog video input signal, the feedback means including:

a low pass filter, the filter receiving the analog error signal and producing a filtered analog error signal;

a transconductance amplifier, the transconductance amplifier receiving the filtered analog error signal and producing the clamping feedback signal; and a sub-loop for input limit detection and protection, receiving an upper voltage limit reference signal, a lower voltage limit reference signal and the analog video input signal, and producing a loop protection signal that modifies the clamping feedback signal.

5. A single loop analog-to-digital conversion, and video clamping circuit according to claim 4 wherein the bandpass of the low pass filter is about 120 Hz.

6. A single loop analog-to-digital conversion and video clamping circuit according to claim 4, wherein the loop protection signal is applied to the analog error signal to modify the clamping feedback signal.

7. A method for performing automated diagnostics on a analog-to-digital conversion and video clamping circuit with an input video signal present, the method comprising the steps of:

(a) converting the input video signal to a digital number;

(b) sampling the digital number during a reference interval;

(c) comparing the digital number to a clamping reference number and producing an error indication if the digital number differs from the clamping reference number by more than a predetermined amount;

(d) generating an analog feedback signal from the digital number, the sign and magnitude of the analog feedback signal being indicative of how much the digital number differs from the clamping reference number;

(e) applying the feedback signal to the input video signal;

(f) varying the clamping reference number by a value that exceeds the predetermined amount;

(g) monitoring the error indication while repeating steps (a) through (e) a plurality of times, the plurality of times being larger than an error limit, to determine that the circuit is functioning properly if the error indication occurs fewer times than the error limit.

8. A method according to claim 7 wherein the comparing step comprises the stops of:

subtracting an offset from the digital number to produce an offset digital number; and producing the error indication if the offset digital number differs from an offset clamping reference number by more than the predetermined amount.

9. A method according to claim 7, wherein the generating step comprises the steps of:

subtracting an offset from the digital number to produce an offset digital number; and digital-to-analog converting the offset digital number to the analog feedback, the sign and magnitude of the analog feedback signal being indicative of how much the digital number differs from the clamping reference number.

10. A method according to claim 9, wherein the generating step further comprises, before the digital-to-analog converting step, the step of:

protecting against a possibility that the offset digital number will be outside of a range of a means for performing the digital-to-analog converting step by making the offset digital number equal a high range value if the offset digital number is larger than the high range value or making the offset digital number equal a low range value if the offset digital number is smaller than the low range value.

11. A method according to claim 7, wherein the monitoring to determine step comprises the steps of:

setting a flag upon the occurrence of the error indication;

reading the status of the flag after a first interval to verify that an error condition occurred;

clearing the flag after the flag has been read; and checking the flay after a second interval to verify that no additional error conditions have occurred.

12. A method according to claim 7, wherein the monitoring to determine step comprises the steps of:

counting occurrences of the error indication; and reading out the count to verify that the count is greater than zero and less than an error limit.

13. A method for performing automated diagnostics on a analog-to-digital conversion and video clamping circuit having an open input, the method comprising the steps of:

(a) converting a level present at the input to a digital number;

(b) sampling the digital number during a reference interval;

(c) generating an analog feedback signal from the digital number, the sign and magnitude of the analog feedback signal being indicative of how much the digital number differs from a first clamping reference number;

(d) applying the feedback signal to the input;

(e) repeating steps (a) through (d) a plurality of times; and (f) reading the digital number and comparing it with a number value corresponding to the clamping reference number and verifying correct operation if the digital number differs from the number value by no more than a predetermined amount.

14. A method according to claim 13 further comprising the steps of:

(g) changing from the first clamping reference number to a second clamping reference number and repeating step (e); and (h) repeating stop (f) using a second number value corresponding to the second clamping reference number.

\* \* \* \* \*